(12) United States Patent
Gemmen et al.

(10) Patent No.: US 7,159,841 B2
(45) Date of Patent: Jan. 9, 2007

(54) PIEZOELECTRIC AXIAL FLOW MICROVALVE

(75) Inventors: Randall Gemmen, Morgantown, WV (US); Jimmy Thornton, Morgantown, WV (US); Jeffrey S. Vipperman, Pittsburgh, PA (US); William W. Clark, Wexford, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 158 days.

(21) Appl. No.: 10/706,477

(22) Filed: Nov. 7, 2003

(65) Prior Publication Data

US 2004/0137300 A1 Jul. 15, 2004

Related U.S. Application Data

(60) Provisional application No. 60/424,544, filed on Nov. 7, 2002.

(51) Int. Cl.
*F16K 31/02* (2006.01)

(52) U.S. Cl. ............... 251/129.06; 429/34; 429/38; 429/39

(58) Field of Classification Search .......... 251/129.06, 251/129.01; 429/22, 26, 34, 38, 39
See application file for complete search history.

(56) References Cited

U.S. PATENT DOCUMENTS

| 4,492,360 | A | * | 1/1985 | Lee et al. ............... 251/129.06 |
| 4,545,561 | A | * | 10/1985 | Brown ................... 251/129.06 |
| 5,258,239 | A | * | 11/1993 | Kobayashi ................... 429/27 |
| 5,343,894 | A | * | 9/1994 | Frisch et al. ........... 251/129.06 |
| 5,899,218 | A | * | 5/1999 | Dugan .................... 251/129.06 |
| 6,086,041 | A | * | 7/2000 | Gattuso et al. ......... 251/129.06 |
| 6,117,579 | A | * | 9/2000 | Gyoten et al. ................ 429/34 |
| 6,164,621 | A | * | 12/2000 | Bouchard et al. ....... 251/129.06 |
| 6,173,744 | B1 | * | 1/2001 | Frisch et al. ........... 251/129.06 |
| 6,475,658 | B1 | * | 11/2002 | Pedicini et al. ............... 429/34 |
| 6,620,273 | B1 | * | 9/2003 | Dai et al. ..................... 251/367 |
| 6,645,651 | B1 | * | 11/2003 | Hockaday et al. ............ 429/19 |
| 6,811,136 | B1 | * | 11/2004 | Eberhardt et al. ..... 251/129.06 |

* cited by examiner

*Primary Examiner*—John Bastianelli
(74) *Attorney, Agent, or Firm*—Bradley W. Smith; Mark P. Dvorscak; Paul A. Gottlieb (57) ABSTRACT

This invention is directed to a fuel cell operable with a quantity of fuel and a quantity of an oxidizer to produce electrical power, the fuel cell including a fuel cell body including a labyrinth system structured to permit the fuel and the oxidizer to flow therethrough; at least a first catalyst in fluid communication with the labyrinth; and at least a first microvalve operably disposed within at least a portion of the labyrinth. The microvalve utilizes a deflectable member operable upon the application of a voltage from a voltage source. The microvalve includes an elongated flow channel formed therein and extending substantially longitudinally between the first and second ends to permit substantially longitudinal flow of the fluid therethrough and between the first and second ends; and the deflectable member disposed on the valve body, the deflectable member including at least a first piezoelectric portion that is piezoelectrically operable to deflect the deflectable member between an open position and a closed position upon the application of a voltage, the deflectable member in the closed position being operable to resist the flow of the fluid through the flow channel.

9 Claims, 9 Drawing Sheets
(2 of 9 Drawing Sheet(s) Filed in Color)

VALVE CLOSED

FIG. 3e
DETAIL SHOWING GEOMETRIC SCALABILITY THROUGH STACKING AS WELL AS THE FLEXIBLE WIDTH

PIEZOELECTRIC AXIAL FLOW MICROVALVE

This patent application claims priority from Provisional Application 60/424,544 filed on Nov. 7, 2002, by the University of Pittsburgh.

STATEMEMT REGARDING FEDERALLY SPONSORED RESEARCH OR DEVELOPMENT

The United States Government has rights in this invention pursuant to employer/employee agreements between the U.S. Department of Energy (DOE) and the inventors and under contracts between the U.S. Department of Energy and the University of Pittsburgh.

BACKGROUND OF THE INVENTION

1. Field of the Invention

This invention relates generally to microvalves. More particularly, this invention relates to piezoelectrically operated microvalves and their use in fuel cell systems.

2. Description of Related Art

Although discovered more than a century ago, fuel cells have received much recent attention due to their promise of compact, efficient, and clean power generation. A fuel cell is an electrochemical device, which directly converts chemical energy stored in a fuel (e.g. hydrogen) and an oxidizer (e.g. oxygen) directly into electrical energy. The reactant gases flow through a labyrinth of flow channels that are lined with catalyzed electrodes which are sandwiched about an electrolytic material. The fuel cell is classified in terms of the electrolyte, e.g. polymer electrolyte membrane (PEM), solid oxide (SOFC), molten carbonate, alkaline or phosphoric acid. The Fuel Cell Handbook (Hirschenhofer, et. al., 1999) published by the Department of Energy (DOE) describes the various types of fuel cells (eg. alkaline fuel cell, molten carbonate fuel cell, phosphoric acid fuel cell, polymer electrolyte membrane fuel cell (PEMFC), solid oxide fuel cell), each of which are in various stages of development. All fuel cells share some common advantages over other fossil energy power sources: 1) Potential for higher efficiency compared to conventional heat engines 2) Zero or near zero emissions of NOx and 3) Simplistic designs that are ideal for mass production. As a result, the interest in fuel cells for automotive power, stationary power, portable power, and military applications is very high. Most of the major automobile manufacturers have, or are developing, prototype vehicles powered by a PEMFC. Other development efforts are ongoing for using the PEMFC for portable, residential, and military power applications. However, some technical and cost issues need to be addressed as well as the establishment of a fuel distribution network before fuel cells will be widely accepted into the commercial market.

Independent of the particular fuel cell technology employed, poor distribution of either fuel or oxidant throughout the fuel cell can cause many problems, including poor fuel conversion efficiency, "hot spots" within the fuel cell, decreased fuel cell life, and reduced cell voltage. Similarly, poor fuel distribution between fuel cells in a fuel cell stack can cause poor fuel conversion efficiency, overall poor stack operation and even damage to the fuel cell.

In order to provide a clearer understanding of the operation of fuel cells, we will discuss here the PEM fuel cell, one of the more widely used types of fuel cells. The PEM fuel cell readily oxidizes hydrogen (which releases electrons to an external load), and reduces oxygen (which reacquires the electrons from the load). A single cell consists of an anode flow field plate, a membrane electrode assembly (MEA) and a cathode flow field plate. The MEA contains a layer of catalyst on each side of the ion exchange membrane to induce the desired electrochemical reactions. The hydrogen fuel flows through the channels in the anode flow field plates and reacts with the catalyst to form cations, which then migrate from the anode to the cathode through the ion exchange membrane. The oxygen flows through the channels in the cathode flow field plates and reacts with the catalyst layer to form anions, which combine with the $H^+$ cations from the anode to form water:

Anode half reaction: $2H_2 \rightarrow 4H^+ + 4e^-$     (1)

Cathode half reaction: $O_2 + 4H^+ + 4e^- \rightarrow 2H_2O$     (2)

Typically, two or more cells are connected in electrical series to form a fuel cell stack. The stack includes inlet manifolds for the fuel and oxidant, and outlet manifolds for removing any unused reactant gas plus the generated water. Other fuel cell technologies will have different half-cell reactions. It is the transfer of electrons from the hydrogen to the oxygen (through an external load) that produces useful electricity. The maximum voltage, E, produced by each cell can be calculated using the Nernst Equation. For the PEM fuel cell:

$$E = E^o + \frac{RT}{2F} \ln\left(\frac{P_{H_2}\sqrt{P_{O_2}}}{P_{H_2O}\sqrt{P^o}}\right) \qquad (3)$$

where E is the equilibrium potential, $E^o$ is the standard potential for an $H_2/O_2$ fuel cell taken at a pressure of $P^o$, R is the universal gas constant, $P_x$ is the partial pressure of gas "x", and F is Faraday's constant.

This ideal equilibrium voltage in practice is reduced by other quantities called Over Potentials. The magnitude of these over potentials depends on such things as the cell's internal electrical resistance, concentration gradients near the cell's electrodes, or the activation energies needed to initiate the desired electrochemical reactions. Notice that the cell's developed potential is limited by the concentrations (or pressures) of reactants at the electrode surface. This clearly indicates that if the concentration of one or both of the reactants were to drop to a low value, the cell's voltage would also drop. Again, concentrations may drop because of the build up of reaction products (such as liquid water as in the case of PEM fuel cells), or because of non-uniform operation of the cell's membrane. Defects in the membrane can also cause low concentrations of needed reactants.

In actual operation, individual fuel cells are combined into a stack such that appreciable voltage can be obtained. Each cell is electrically wired in series and reactants and effluents flow through common manifolds. The cells are controlled as a unit by specifying the pressure and flow through these manifolds. The desired operating point for a system is determined based on competing factors such as desired life cycle, operating efficiency, and capital versus operating costs. Every cell within the stack is not identical and inherently performs slightly differently given the same input conditions since there are variances in the ohmic polarizations, catalyst loadings, and diffusion constants, for example. In addition, both the PEFC and the SOFC use a fixed flow field and inlet fuel flow manifold design. The cell geometry within a fuel cell stack provides many flow paths for reactants to flow, which inherently creates flow distribution problems that can potentially cause inefficiencies or even damage to individual cells. There is currently no mechanism to monitor or control individual fuel cells within a stack system.

In particular, the existing PEM fuel cell stack systems experience problems associated with poor distribution of reactant fuel across the membrane surface, which inherently causes a decrease in the membrane life cycle. In addition, excess reactant flow is commonly used to correct for insufficient flow distribution across the membrane surface, and this causes a decrease in fuel utilization efficiency. To further illustrate the problems that arise due to mal-distribution of reactants, consider a PEM stack employing cells with parallel flow channels. Problems arise when the generated water vapor condenses onto the channel surfaces thereby blocking or restricting the flow through the channel, and the amount of hydrogen reacting with the catalyst. When this happens, the associated cell will perform poorly (generate low voltage and current) and cause the cell to overheat locally at the misbehaved channel. Damage can result if the stack is operated for too long at these conditions. These situations can arise at different operating points, depending on the temperature, pressure, anode and cathode flow rates, and power draw from the stack. This makes the design of the channel and manifold geometry difficult, especially if the system is to be used under a wide range of operating conditions. Additionally, the aforementioned situations can go unnoticed by typical control strategies that only monitor the overall stack voltage. Simply correcting for lost voltage due to poor flow distribution by boosting the flow (and therefore voltage) across other cells may ignore the potentially catastrophic failure of the "bad spot" in the problem cell. What is needed, it is believed is an apparatus and process that permits improved flow control over the PEM fuel cell system. The inventors believe that the novel technique of integrated flow distribution and control for individual fuel cells within the stack that is proposed will answer this need.

Currently, fuel cell designers have tried to manage the concentrations of needed reactants by imposing relatively large pressure drops across the flow channels across the total cell, thereby attempting to ensure adequate flow in each individual channel within the cell.

Microelectromechanical or MEMS technology offers the promise of cheap mass-production of compact electromechanical systems for embedded sensing and control applications such as those required for reliable and efficient fuel cell system operation. It is hoped that such devices would allow localized flow controllers to be embedded directly into the flow channels of the fuel cell, at a fraction of the cost of conventional technology and with no size penalty. Therefore, NETL is investigating MEMS for controlling flow within the stack to increase performance and decrease life cycle cost of fuel cell systems. There is a need for improved flow control within the fuel cell stack.

Minimizing cost is very important, yet the lowest cost electricity from a PEMFC occurs at higher nominal cell potential where the fuel cell is more efficient, and the savings on fuel costs offset the capital cost of additional cells [6]. However, for automotive applications, for example, the size and weight of additional cells and the stack performance at higher current density conditions can have a significant impact on cost. Kazmin [7] developed a model to determine the minimal efficiency one can operate a PEMFC in order to make the fuel cell system technically and economically feasible. In Kazmin's model the minimum stack operating efficiency that provides acceptable economics is mainly affected by the fuel cost and cell efficiency. To maximize operating efficiency the parasitic power requirements must be minimized and each cell within the stack must operate as designed.

In addition, reducing the parasitic power requirements can be achieved through the use of low power control devices, and reducing the amount of peripheral hardware required to control the stack. Furthermore, maximum efficiency can only be achieved through effective thermal and water management, and proper gas flow distribution to each cell within the stack. A recent development effort for 1 kW class PEMFC power system shows how the cell-to-cell voltage distribution within a stack can be improved through effective thermal and flow management techniques. Lee noted that in a single cell, the optimum fuel flow rate is 1.3 times the required fuel stoichiometry, but in a stack the fuel flow rates must be set much higher to ensure adequate fuel flow to each cell within the stack. This is a typical approach to ensure adequate fuel flow to each cell, and the unused fuel is re-circulated back to the inlet. A variation of this technique, named the anode water removal technique, requires an increased pressure drop across the cell and increased amounts of unused fuel to re-circulate [8]. More importantly, as shown by Lee, inadequate distribution of fuel cell-to-cell can cause irreparable damage to the MEA and lead to cell failure.

An alternate approach that is under investigation at the National Energy Technology Laboratory (NETL) is to integrate small micro-valves along the fuel feed manifold of the stack to control the fuel flow to each cell within the stack. By providing cell-to-cell flow control, the additional flow required for stack operation can potentially be reduced below the stated 1.3 times the stoichiometry, which improves fuel efficiency. More importantly, the overall efficiency can be improved by optimizing the performance of each cell within the stack. For example, the data produced by Lee [3] with the improved control technique still has greater than 10% variation of cell-to-cell voltages within the stack at relatively low current density conditions. It is anticipated that local flow control can minimize this cell-to-cell voltage variation and also reduce the required peripheral hardware, thus maximizing reliability and efficiency, and reducing cost. In addition, by using the micro-systems manufacturing techniques the additional capital cost for the micro-valves could be low.

Overview of Microvalves

Figure 1:
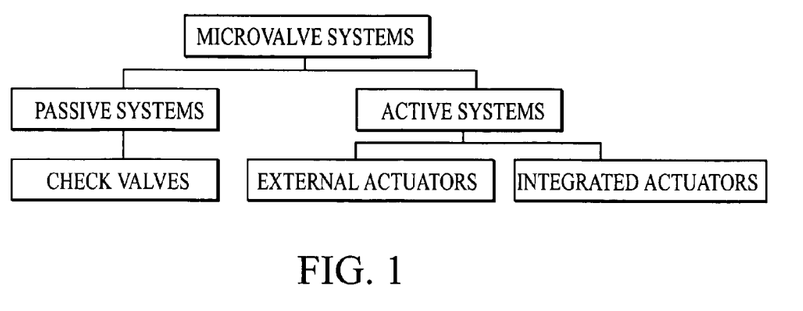
FIG. 1 is a schematic diagram showing the classifications of different microvalves.

Microvalves are characterized by their geometry, actuation mechanism, whether they are active or passive, normally open or closed, and whether they contain external or integrated actuators as depicted in FIG. 1. Additionally, their membrane material may also be used to characterize them. Membrane materials are typically divided into silicon-based and non silicon-based. "Normally open" ("closed") simply means that the valve is open (closed) when no power is applied. Most MEMS microvalves are silicon-based since they are created using existing silicon chip fabrication methods established by the electronics industry. Newer MEMS fabrication techniques (Lithographie Galvanoformung Abformung (LIGA), LIGA-like, Deep Reactive Ion Etching (DRIE), etc.) permit mass fabrication, including non-silicon parts, with high aspect ratios. Other materials previously incorporated into microvalve designs include Titanium, Nickel, Copper, Aluminum, and silicone.

Figure 2:
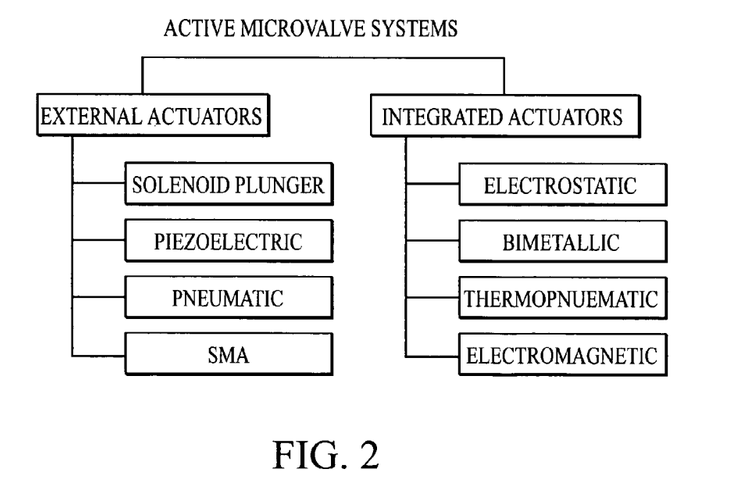
FIG. 2 is diagram of different activation mechanisms for microvalves.

The actuation mechanism in active microvalves includes a means to open and close an orifice and regulate the flow. This classification can be further divided into external and integrated actuators as depicted in FIG. 2. External actuators include solenoid plungers, piezoelectric stack actuators, and pneumatic devices. Integrated actuators provide an intrinsic mechanism to actuate the valve such as electrostatic attraction, heating of bimetallic strips, thermopneumatic (heating/expansion), shape memory alloy (SMA), and electromagnetic. Each type of mechanism offers advantages and disadvantages in terms of cost, complexity, speed, performance, and reliability. These factors must be optimized for the given applications.

The unique requirements of the fuel cell application must be considered for the microvalve design. These include hydrogen tolerance, thermally-insensitive activation mechanism, and geometric constraints. The commercially available valves will not meet all of the requirements, necessitating a custom valve design. Whichever materials are chosen, they must survive the inside environment of the fuel cell. Note that the silicon substrate used for MEMS devices are typically monocrystalline, meaning that hydrogen embrittlement at grain boundaries would not occur.

Requirements for Fuel Cell Application

A more complete list of requirements for the PEM fuel cell application include:
1. Embeddable into a PEM fuel cell
2. Normally-open
3. Operate from 80–120° C.
4. Non thermally activated actuation mechanism
5. Line pressure and maximum pressure drop of 1 psi
6. Survive $H_2$ environment
7. 0.5 slpm maximum flow rate per cell
8. Operate directly off of cell voltage (0.8 V), if possible
9. Amenable to self-regulating control, if possible
10. Low power consumption
11. Low batch cost and ease of fabrication The fuel cell must use a normally open microvalve so that the fuel cell will still operate if the microvalve fails and also to easily permit startup of the fuel cell. The variable operation temperature precludes using the three commercially available valves, which are thermally activated. The four thermally-insensitive actuation mechanisms (and their disadvantages) are: pneumatic (requires an external air source), piezoelectric stack (low displacement), electrostatic (weak), and electromagnetic (requires external magnetic field). The low displacement of the piezoelectric transducer can be ameliorated by using mechanical structures to amplify their motion (e.g., a trimorph structure). The maximum flow rate was determined by NETL and was based upon the maximum power output of the fuel cell test bed. The desire to operate off of the cell voltage would eliminate the need for an external power bus to the embedded microvalves. It is further hoped that proportional control based upon feeding back the cell voltage would be effective for flow management.

The number and variety of application areas for microvalves have been increasing rapidly due to their small size, low-power consumption and relatively large flow rates. However, commercially available microvalves do not meet the unique requirements of the fuel cell application. Commercial microvalves have larger dimensions than the required design and their operating temperature limits are not in the range of fuel cell microvalve requirements and some of microvalves are not suitable for hydrogen environment, necessitating a custom design. A review of commercially available microvalves is contained within a previous publication detailing the design and analysis of a novel microvalve using a piezoelectric trimorph actuator [9]. This design offers many advantages over existing valves, including axial flow, which permits vertical scaling and the ability to easily embed into flow channels. In addition, the valve offers a high degree of simplicity, low voltage operation, good linearity, and temperature insensitivity. The disadvantages are few, including the inability to completely clamp off the flow (acceptable for this application), and being potentially fragile, which can be mitigated to some degree by design.

BRIEF SUMMARY OF THE INVENTION

An object of this invention is to provide a fuel cell control device that will operate under the chemical, temperature, and pressure environment of a fuel cell.

Another object of this invention is to provide a fuel cell control device that will fit within the limited space confines of a fuel cell.

Another object of this invention is to provide a fuel cell control device that will not draw a significant amount of power from the fuel cell.

These and other objectives of the invention, which will become apparent form the following description, have been achieved by a novel piezoelectrically actuated microvalve operable to affect the flow of a fluid upon application of a voltage from a voltage source, the microvalve comprising; a valve body having a first end and a second end, the valve body including an elongated flow channel formed therein and extending substantially longitudinally between the first and second ends to permit substantially longitudinal flow of the fluid therethrough and between the first and second ends; and a deflectable member disposed on the valve body, the deflectable member including at least a first piezoelectric portion that is piezoelectrically operable to deflect the deflectable member between an open position and a closed position upon the application of a voltage, the deflectable member in the closed position being operable to resist the flow of the fluid through the flow channel. Further the deflectable member of the microvalve may include a second piezoelectric portion that is cooperable with the first piezoelectric portion to deflect the deflectable member between the open and closed positions. The deflectable member may include an intermediate layer interposed between the first and second piezoelectric portions. Preferably, the intermediate layer is a ductile material, such as brass.

The valve body may include a cavity formed therein, at least a portion of the deflectable member being disposed in the cavity. Preferably, the deflectable member includes a fixed end and a free end, the fixed end being secured to the valve body; and the deflectable member including a gate disposed at the free end, at least a portion of the gate being receivable in the flow channel to resist the flow of the fluid through the flow channel when the deflectable member is in the closed position.

In one embodiment of the microvalve, the valve body includes a first wafer, a second wafer, and a third wafer; deflectable member includes a fixed end and a free end; the cavity being disposed substantially between the first and second wafers; and the flow channel being disposed substantially between the second and third wafers. Preferably, the second wafer includes an opening formed therein; and at least a portion of the gate being receivable in the opening.

Further, the second wafer includes a port formed therein, the port providing fluid communication between the flow channel and the chamber.

The microvalve may be stacked upon another similar microvalve. Preferably, the microvalve is structured to be used in a low voltage application. Further, the microvalve should be structured to resist degradation by hydrogen gas. This protection from degradation by hydrogen gas can be achieved by the application of a coating, such as a diffusion barrier coating.

Preferably, the microvalve should be constructed such that the deflectable member is deflectable in a substantially linear manner in response to a voltage applied thereto. In addition, the first end and second end of the valve body are opposite one another or the fixed end and the free end of the deflectable member are opposite one another.

This invention is also directed to a fuel cell operable with a quantity of fuel and a quantity of an oxidizer to produce electrical power, the fuel cell comprising a fuel cell body including a labyrinth system structured to permit the fuel and the oxidizer to flow therethrough; at least a first catalyst in fluid communication with the labyrinth; and at least a first microvalve operably disposed within at least a portion of the labyrinth; wherein the first microvalve includes a valve body, and deflectable member operable upon the application of a voltage from a voltage source; a valve body having a first end and a second end, the valve body including an elongated flow channel formed therein and extending substantially longitudinally between the first and second ends to permit substantially longitudinal flow of the fluid there through and between the first and second ends; and the deflectable member disposed on the valve body, the deflectable member including at least a first piezoelectric portion that is piezoelectrically operable to deflect the deflectable member between an open position and a closed position upon the application of a voltage, the deflectable member in the closed position being operable to resist the flow of the fluid through the flow channel. Further, the deflectable member of the microvalve may include a second piezoelectric portion that is cooperable with the first piezoelectric portion to deflect the deflectable member between the open and closed positions.

Further, the deflectable member may include an intermediate layer interposed between the first and second piezoelectric portions. The deflectable member may include an intermediate layer that is formed from brass or another ductile material. The valve body may further include a cavity formed therein, at least a portion of the deflectable member being disposed in the cavity. The deflectable member of the microvalve may include a fixed end and a free end, the fixed end being secured to the valve body; and the deflectable member including a gate disposed at the free end, at least a portion of the gate being receivable in the flow channel to resist the flow of the fluid through the flow channel when the deflectable member is in the closed position.

Further, the valve body includes a first wafer, a second wafer, and a third wafer; deflectable member includes a fixed end and a free end; the cavity being disposed substantially between the first and second wafers; and the flow channel being disposed substantially between the second and third wafers. In addition the second wafer includes an opening formed therein; and at least a portion of the gate being receivable in the opening. Further, the second wafer includes a port formed therein, the port providing fluid communication between the flow channel and the cavity. The first and second ends of the valve body are opposite on another and the fixed end and the free end of the deflectable member are opposite one another.

BRIEF DESCRIPTION OF THE SEVERAL VIEWS OF DRAWINGS

The patent or application file contains at least one drawing executed in color. Copies of this patent with color drawings will be provided by the Patent and Trademark Office upon request and payment of the necessary fee. With this description of the invention, a detailed description follows with reference being made to the accompanying figures of drawings which form part of the specification, in which like parts are designated by the same reference numbers, and of which.

The invention is not limited in its application to the details and construction and arrangement of parts illustrated in the accompanying drawings since the invention is capable of other embodiments that are being practiced or carried out in various ways. Also, the phraseology and terminology employed herein are for the purpose of description and not of limitation.

DETAILED DESCRIPTION OF THE INVENTION

Description of the Preferred Embodiment(s)

Figure 3A:
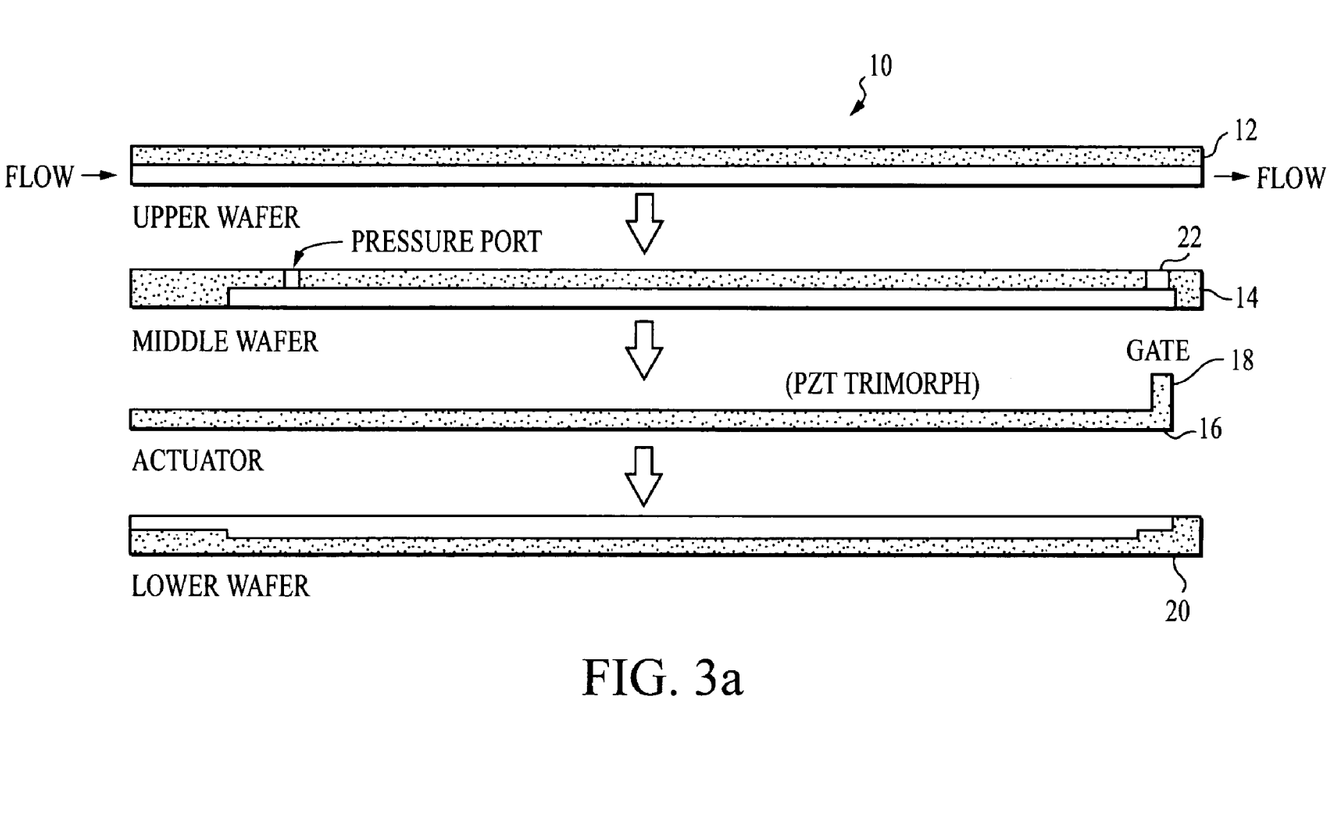
FIG. 3a is a cross-sectional expanded side plan view illustrating a microvalve of this invention.
Figure 3B:
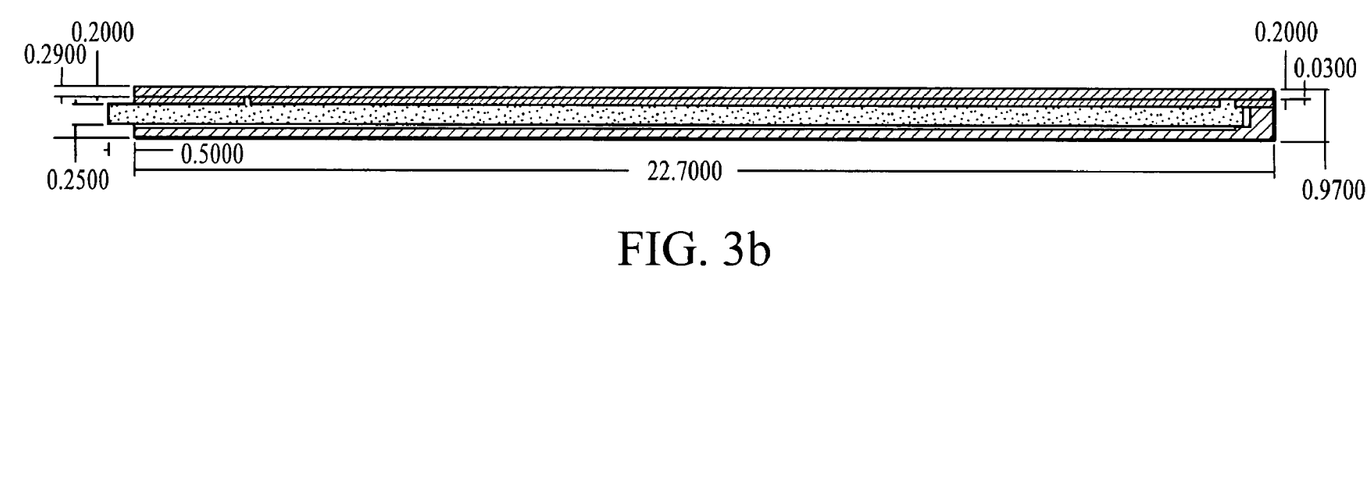
FIG. 3b is a cross-sectional side plan view of the microvalve illustrating the microvalve as assembled.
Figure 3C:
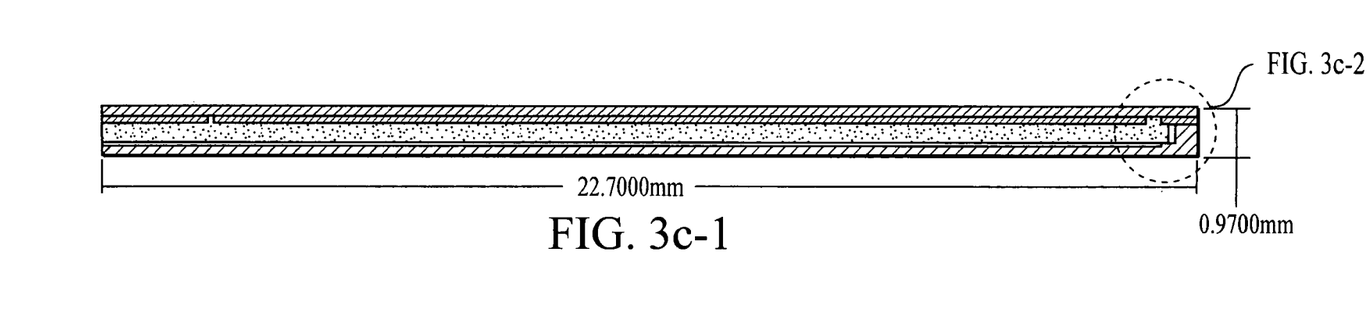
FIG. 3c is an enlarged cross-sectional side plan view of the microvalve in the open position.
FIG. 3d is an enlarged cross-sectional side plan view of the microvalve in the closed position.
FIG. 3e shows the stacking of the microvalves.
Figure 3C:
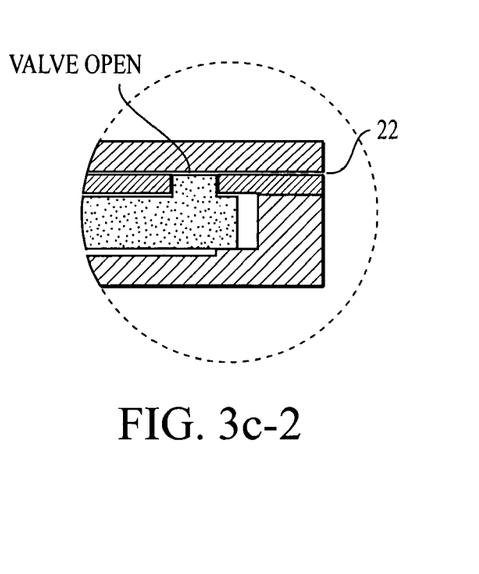
Figure 3D:
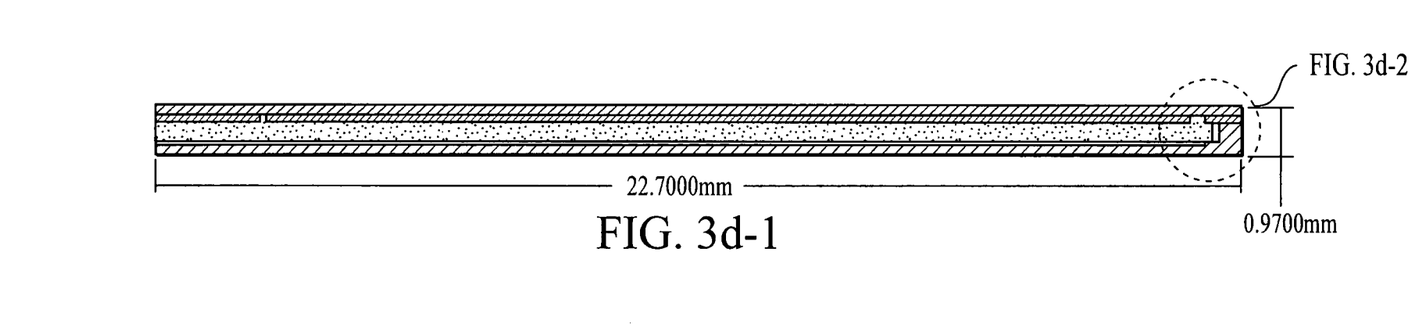
Figure 3D:
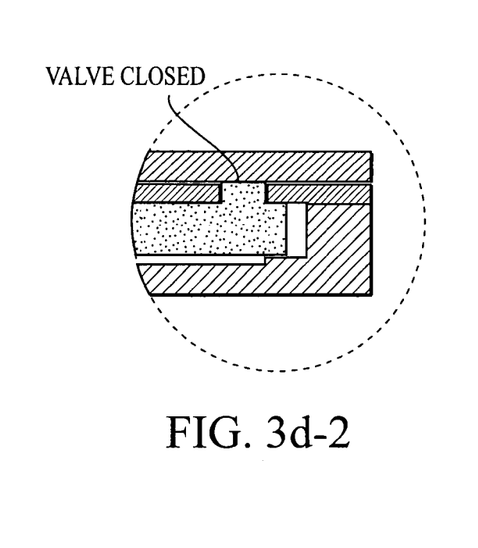
Figure 3E:
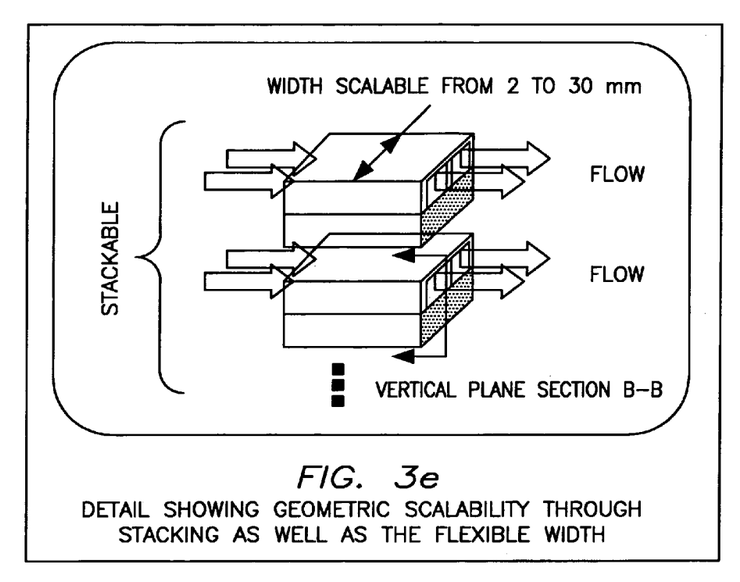

The microvalve of this invention is shown generally in FIG. 3a at 10 in spaced apart fashion. FIG. 3b illustrates the microvalve as an assembled unit. The microvalve comprises an upper member part 12, a middle wafer part 14, an actuator 16 and a lower member part 20. Flow is generally from left to right through the microvalve. At the heart of the valve is a piezoelectric trimorph actuator 16 that is used to open and shut an axial flow valve via a valve gate 18. The valve gate can be formed from materials such as, but not limited to stainless steel or silicon. Three wafers 12, 14, and 16 are fabricated out of silicon to create the flow channel and support the actuation mechanism. The middle member part 14 or wafer serves to shield the actuator 16 from the fluid pressure forces. The gate 18 moves through port 22. FIG. 3b shows a dimensioned drawing of the side view of an assembled microvalve. Note that the piezoelectric actuator 16 mechanism extends past the valve body on the left-hand side, permitting the electrical connections to be easily made. The microvalve is shown in the normal open position in FIG. 3c. When a voltage is applied, the gate moves though port 22 to block the flow as shown in FIG. 3d. The units can be readily stacked as shown in FIG. 3e. The microvalves can be installed in the cells of a fuel cell such as a PEM. There are many novel attributes about this valve design, including:
1. Scalable geometry in height (by stacking) and width
2. Axial Flow
3. Relatively Simple
4. Non-thermally activated
5. Low-voltage operation
6. Linear actuator response
7. Possibly linear flow characteristic Piezoelectric Trimorph Actuation Mechanism A trimorph actuator is created by sandwiching a 25μm thick brass shim between two 127-μm thick lead zirconate-titanate (PZT-5H) patches. Parallel electrical connections are made between the patches, which are oriented to have parallel polarization directions. This configuration provides higher deflection for a given voltage compared to previous valve designs based upon a piezoelectric stack.

Piezoelectric Trimorph Actuation Mechanism

A trimorph actuator is created by sandwiching a 25 μm thick brass shim between two 127-μm thick lead zirconate-titanate (PZT-5H) patches. Parallel electrical connections are made between the patches, which are oriented to have parallel polarization directions. This configuration provides the most deflection for a given voltage.

Hydrogen and Erosion Tolerance

Since the valve is directly embedded into the fuel channels of the fuel cell, it must be able to withstand a pure hydrogen gas environment at the operating conditions (1 psig at 80–120° C.). The three considerations are diffusion of the hydrogen into the valve components, hydrogen embrittlement, and reaction of hydrogen with other compounds. Diffusion will occur since the $H_2$ molecules are so small. At material grain boundaries, diffusion is known to be much quicker and can also lead to hydrogen embrittlement—where a material fails in brittle fracture due to the formation of brittle hydride components. Further, hydrogen gas may reduce the titanium from PZT, which will change the electrical properties of the material (make it more conductive).

Materials have been selected to resist the effects of hydrogen. For example, brass and other non-oxide compounds of copper are known to tolerate hydrogen environments quite well. The silicon that is used is single crystal, which will have no grain boundaries to speed the diffusion of hydrogen. Further, reaction of silicon with hydrogen gas to form silicon hydrides requires higher temperatures than the operating point of the PEM fuel cell. Hydrogen can also diffuse and react with PZT. This is a completely reversible reaction, which is not expected to be significant at such relatively low pressures and temperatures. A diffusion barrier (e.g. a thin coating of polyamide) can be used to slow the effects of hydrogen if found to be a problem during testing.

Erosion occurs as the result of high velocity particles impinging upon valve surfaces and wearing them away. These particles are typically sand, slurries, or flashing liquids. Flashing is a stage of cavitation, which results when the vapor pressure of the liquid is reached. A fluid must accelerate through the minimum area of the valve (vena contracta), which is associated with a corresponding decrease in pressure. Erosion is a function of velocity squared and is typically mitigated by using hard, gall-resistant materials or polymer coatings. Although the final valve design will result in a high velocity, it is not expected that the water vapor will cause much of a problem (would have to condense out and then flash while traveling through the valve). Nevertheless, a good erosion-resistant material was chosen for the valve gate-silicon. This material performs exceptionally well and is also compatible with hydrogen gas. Silicon seems to provide better erosion resistance than stainless steel. Knoop hardness for silicon is 1150 compared to 660 for 440 stainless steel.

Analysis

A coupled thermal-electrical-mechanical analysis of the actuation mechanism for the valve was performed using ANSYS cite and MATLAB. In addition, the flow through the microvalve was analyzed using the same software packages. Finally, the thermal effects were added to the analysis. The next sections treat the electro-mechanical, flow, and thermal analyses, respectively. These models were used to perform a parametric study to optimize the geometry, forces, flow, and fabrication of the valve.

Electromechanical Analysis

Figure 4:
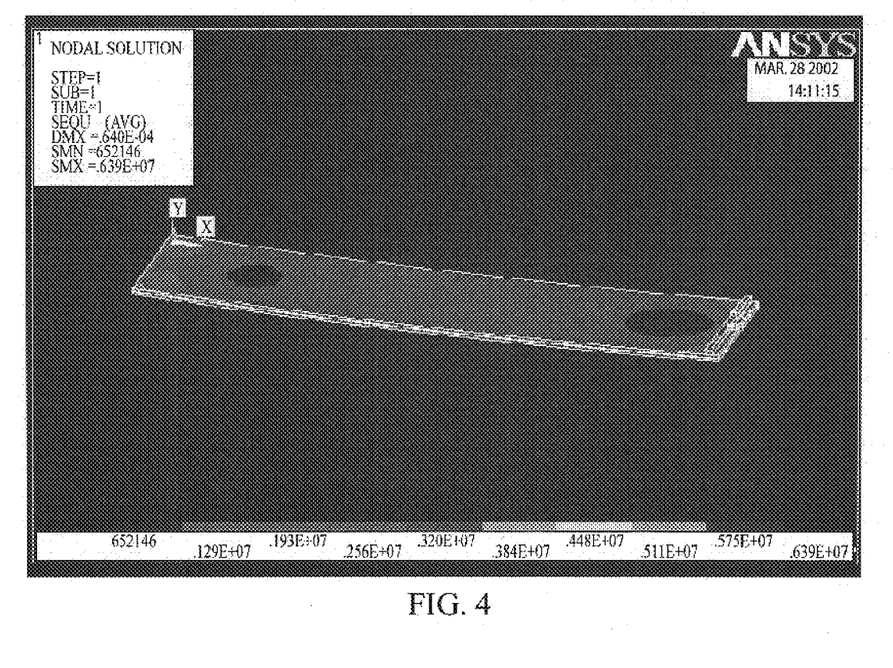
FIG. 4 is a computer graphic of the Von Misses stresses on acturator resulting for the 10-volt input.
Figure 5:
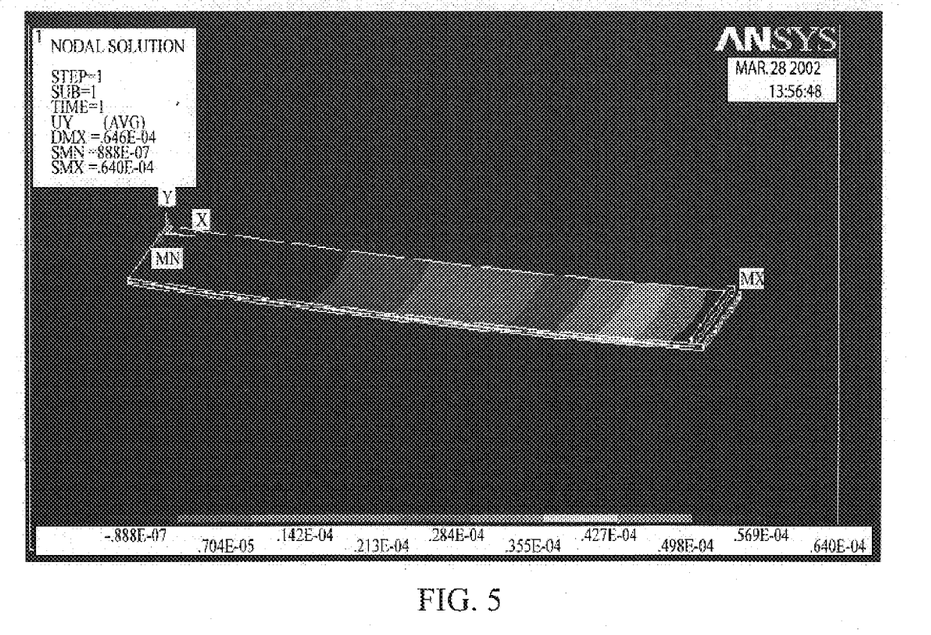
FIG. 5 is a computer simulation of the deflection of PZT trimorph actuator for a 10-volt input.

The final actuator mechanism design has dimensions of 22500×4000×290 microns. The thickness of 290 μm includes two PZT layers of 127μm each, a 25-μm brass layer and two glue layers that should not exceed 11 μm. ANSYS coupled field element 5 and brick element 45 were used to model the piezoceramic layers and the inner brass layer, respectively. A mesh convergence was performed and a mesh size of 200 microns was used. Both deflection and stresses were analyzed for a 10-volt (the maximum permitted for this application) excitation on the piezoceramic. The deflection is shown in FIG. 4 and 5 was used to determine the maximum height of the valve flow channel, when considering the fluidic forces. A maximum deflection of 64 μm is obtained for the 10-volt excitation. The von Misses stresses are shown in FIG. 4 and were used to determine if the materials would fail during actuation. The maximum observed stress is 6.4 MPa. Since the failure strengths of PZT and brass are 63 and 270 MPa, respectively, the factor of safety for the device is about 10 in the absence of fluid and thermal loads. Note that the final valve design calls for only a 5-volt excitation since only 30 microns of deflection is required. The stresses will subsequently decrease by half as much for the 5-volt excitation as well (3.2 MPa).

Figure 6:
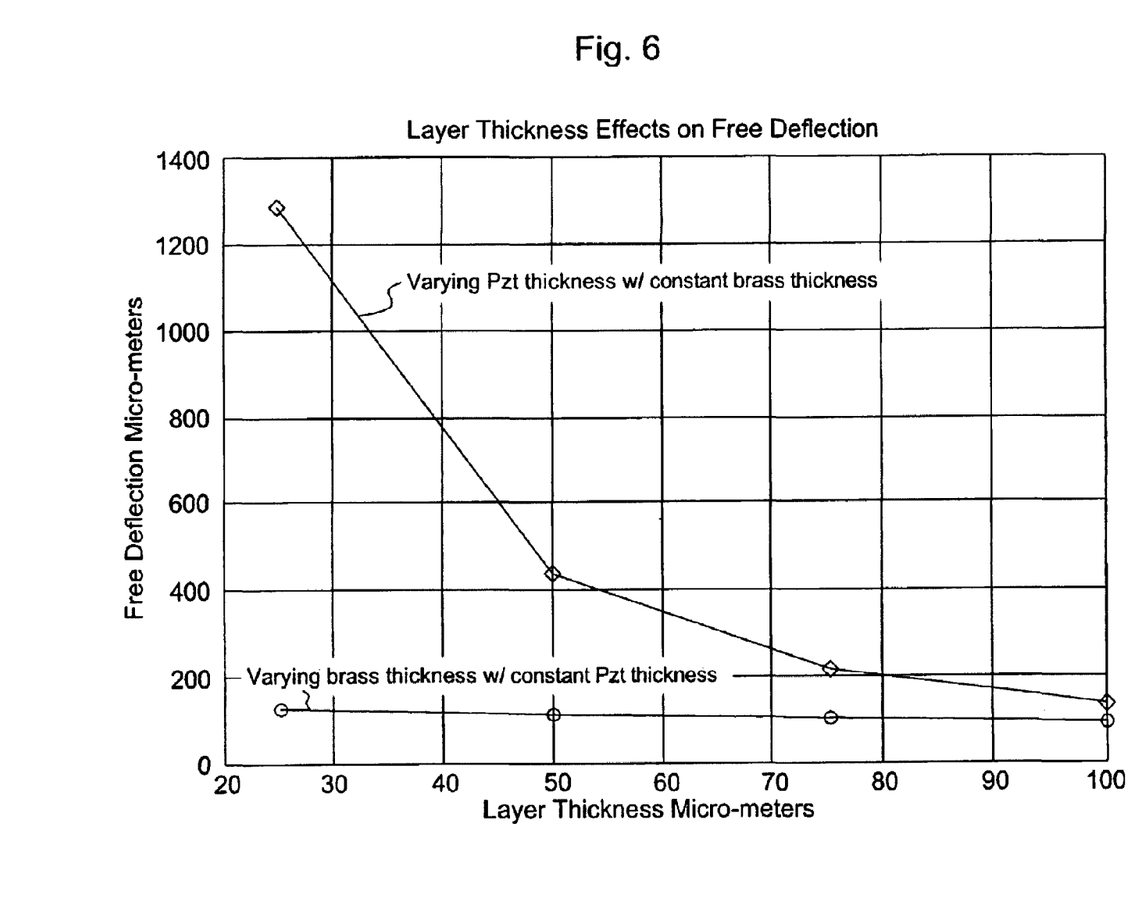
FIG. 6 is a graph of the effect of PZT and brass layer thickness on trimorph tip deflection.

Finally, the results of the parametric analysis determined that tip deflection increases linearly with applied voltage. Increasing the length and width of the transducer was also found to increase the tip deflection. The length was found to have a quadratic relationship with tip deflection and the width provides increased tip deflection through the Poisson effect, at the expense of higher stresses and potential to crack the piezoceramic. Layer thickness for the brass and PZT also was found to be inversely proportional to tip deflection, as shown by the results in FIG. 6.

Finally, the force defection diagram for the piezoelectric actuator can be found by connecting the straight line between the blocked force (zero deflection) and free deflection (zero force) conditions. A free deflection of 32 microns at 5 volts has been selected for the operating point. The blocked actuator tip force (that is the tip force required to prevent deflection when a voltage is applied) of $F_B$=7.3 mN for a 5-volt excitation was determined iteratively using ANSYS. The slope of this line can be determined from the two end points as m =(7.3mN)/(−32μm)=−228 μN/μ. Note that a 5-volt excitation is only 8% of the 0.5 Mv/in depolarization field for the piezoceramic.

The flow analysis determined the flow rates and drag and pressure forces inside the microvalve given the required flow rate of 0.44 slpm per fuel cell and the desired maximum pressure drop of 1 psi. Again, this analysis was iterated with the above electromechanical analysis and used to optimize the microvalve geometry.

Since two valves can be vertically stacked within the flow channel of the graphite plate, the maximum flow rate for a single valve was taken to be 0.22 slpm or 3.7e-6 m³/s. The cross sectional area of the flow channel is $A=4000 \times 30$ $\mu m=12 \times 10^{-8}$ m² resulting in a flow velocity of $V=Q/A=30.6$ m/s. Given a density of hydrogen of $\rho=0.0704$ kg/m³ at 1 psig and 100° C., the mass flow rate through each microvalve would be m=2.58e-7 kg/s. The Mach number, Ma, is found to be:

$$Ma = \frac{V}{c} = \frac{V}{\sqrt{\gamma RT}} = \frac{30.6}{\sqrt{1.4 \times 4157 \times 373}} = 0.021 \quad (4)$$

c is the sound speed, $\gamma=1.40$ is the ratio of specific heats, R is the ideal gas constant for hydrogen, and T=100° C. is the temperature. This flow is subsonic and incompressible since Ma<<0.3. The dimensionless Reynolds number, Re, is computed as:

$$Re = \frac{\rho V D_h}{\mu} = 14.5 \quad (5)$$

where $\mu=8.82e-6$ kg/m/s is the coefficient of viscosity for hydrogen (100° C.,) and $D_h=2 \times w \times h/(w+h)=5.96e-5$ m is the hydraulic diameter, which is a function of the flow channel width, w, and height, h. Since Re<2300, the flow through the microvalve will be laminar. An important dimensionless parameter in microfluidic analysis is the Knudsen number, Kn, which is defined as the ratio of the mean free path, $\lambda$, over a characteristic geometry length, L.

Note that it can also be computed from the Mach and Reynolds numbers. For a fluid, appropriate flow and heat transfer models depend on the range of the Knudsen number. If it is less than 0.01, than the fluid is considered to behave as a continuum while for Knudsen numbers bigger than 10, it is considered as a free molecular flow, and in the range of 0.01<Kn<10 slip or transitional flows may occur. Since Kn<0.01, the microvalve behaves as a continuum, meaning that the Navier-Stokes equations with no-slip boundary conditions will govern the flow.

Next, the forces on the actuator due to the friction drag and pressure drop are computed. The friction drag force, $F_D$, is a function of the flow area and flow velocity as:

$$F_D = \frac{1}{2} = \rho C_D A V^2$$

where $C_D$ is the coefficient of drag, which was conservatively chosen to be $C_D=2.5$ based upon graphs of drag coefficients for laminar flows. The velocity will increase when the valve is partially closed. To be safe in all conditions, the drag force is calculated for the worst-case scenario i.e. for a maximum area of 4 μm×30 μm (valve closed—which is actually no flow) and a flow velocity of 10 times the average velocity.

The resulting drag force on the gate is calculated to be 990 μN. This force creates an equivalent moment around the tip of the actuator, which can be calculated based upon the geometry to be $M_{D,eq}=F_D \times d=0.33$ μN-m, where d=335 μm is the vertical distance from the neutral axis of the bender to the centroid of the exposed valve gate. The resulting equivalent vertical force is then found from $M_{D,eq}=F_{D,eq} \cdot l$, where $l=20$ mm is the free length of the cantilevered bender. From this equation the equivalent vertical force is calculated as 17 μN.

The pressure drop across the valve gate will create an additional horizontal force, where ΔP is the pressure drop across the gate and A is the exposed area. For the maximum pressure difference of ΔP=1 psig and the maximum exposed area of $A=12 \times 10^{-8}$ m² (valve closed) the pressure force is calculated as $F_P=830$ μN. The resulting moment and vertical bender tip force are: $M_{P,eq}=0.28$ μN-m and $F_{P,eq}/d=14$μN, respectively. The total vertical force on the bender due to fluid effects is the sum of the two contributions =30μN. Note that the pressure port shown in FIG. 3a serves to equalize the pressure across the piezoelectric trimorph actuator, preventing undue additional forces.

Thermal Analysis

Finally, the thermal effects were added to the analysis to ensure that thermally induced stresses will not cause the valve actuator to fail and to ensure that internal clearances are sufficient given the nominal operating temperature of 100° C. The ANSYS model was use to perform the coupled electrical, thermal, and mechanical analysis. Since the valve will be cured at 100° C., and cooled to room temperature of approximately 20° C., a temperature differential of 80° C. was considered. Thermal conductivity of the lead zirconate titanate PZT-5H is estimated by dividing Aluminum's conductivity by 200 (personal communication, Piezo Systems, Inc.)

FIG. 5 shows the von Misses stress distribution over the actuator for the fully coupled analysis. The stress level on most of the parts is between 2 MPa and 9 MPa. A maximum stress of 63 MPa occurs on the brass shim near the cantilevered edge. The maximum stress on the piezo layers is found to be around 40 MPa, which occurs on the cantilevered end and around the gate. Since the strength values for piezo and brass are 63 MPa and 270 MPa, the microvalve will operate safely under maximum temperature difference. Note also, that the maximum thermal stress occurs at room temperature (when not in service) since the actuator is cured at elevated temperature and then cooled. Therefore the operational factor of safety will actually be much higher than 63MPa/40MPa=1.5. The resulting residual thermal stresses that occur from cooling will disappear as the valve is heated to operating temperature, which is the primary mode of operation for this valve.

Fabrication Plan

The fabrication will involve the construction of the actuator assembly, machining of the silicon wafers that form the valve body, and assembly of the parts. Although the valve prototypes will involve much manual fabrication and assembly, the basic techniques are borrowed from the semiconductor electronics industry, which has the promise of mass-producing high volumes of parts with little oversight and at affordable costs.

Actuator Construction

The actuator construction consists of dicing the piezoceramic material into the correct sizes, cutting the brass shim, bonding the layers together, and creating the internal electrical connections. A wafer-dicing saw can be used to carefully saw the piezoceramic material into the correct shapes. Once cut, fine grain sand paper can be used to dress any rough edges. When the two outer piezoceramic electrodes are electrically connected to form one input terminal and the middle brass shim the other, a parallel electrical connection is made (highest displacement per voltage). The patches will have anti-parallel electrical fields and the polarization will be parallel, resulting in a bender element.

Before the internal connections are soldered, the actuator will first be bonded using a high strain-performance adhesive. All adhesive bonds will be cured under vacuum and at elevated temperature (100° C.). By applying a vacuum, voids will not occur in the glue layer. Elevated cure temperatures are known to improve cross-linking and hence the quality of the bond layer.

Micromachining of Silicon Valve Body

The valve body is constructed from single crystal silicon substrate and requires high-aspect ratio machining. Such machining is best performed using LIGA (Lithographie Galvanoformung Abformung), LIGA-like, or deep reactive ion etching (DRIE). The latter will be used in this study. DRIE etches using a plasma stream that can be tailored to different materials by selecting the appropriate ionized gas. It is a subtractive process, whereby a mask is created on the surface of the stock, which will shield the parts that are not to be machined. The depth of the machining will be controlled by the length of time that the masked device is exposed to the etchant. For devices that have grooves or holes machined down to different levels, e.g. the lower and middle wafers, multiple masks and subsequent DRIE cycles are required. After machining, the etch resist is chemically removed and the parts cleaned.

Final Assembly

The final assembly involves carefully aligning the parts under a microscope and bonding using the same adhesive and procedures used for the actuator assembly. To create the valve stack (2 valves) to be used in the fuel cell, the two valves will be bonded in the same manner. Note that a small portion of the piezoceramic trimorph will extend beyond the edge of the valve body, allowing the external electrical connections to be made using a wire bonder.

A piezoelectric microvalve has been designed and analyzed. The valve is to operate inside the hydrogen flow stream of the PEM fuel cell stack used for the flow control energy management research at NETL-Morgantown. Materials have been selected which have good hydrogen resistance. ANSYS was used to analyze the coupled electrical, thermal, and mechanical response. A fluidic analysis was also performed to determine the flow characteristics as well as the actuator forces that result from the fluid motion and pressure drop. It was found that the valve could withstand the forces resulting from thermal, fluid, and piezoelectric loading. Finally, a fabrication plan has been developed to create the valve. Table 1 summarizes the final geometry, operating conditions and results such as maximum deflection, and maximum stress values over the actuator. It also gives the failure strengths for actuator materials for a quick comparison with maximum stresses on them.

This following describes the design, fabrication, and test results for a novel micro-valve for cell-to-cell flow control in a fuel cell stack Microvalves for Fuel Cells

TABLE 1

Summary of design.

| Property | Value |
| --- | --- |
| Actuator length | 20 mm |
| Actuator width | 4 mm |
| Actuator thickness | 290 mm |
| Operating Voltage | 5 V |
| Operating Temperature | 100° |
| Maximum Pressure Drop | 1 Psi |
| Maximum deflection | 32 μm |
| Maximum Elongation | 6 μm |
| Operating Stress on Brass Shim | ≦3.2 MPa |
| Brass Failure Strength | 270 MPa |
| Operating Stress on Piezo Layers | ≦3.2 MPa |
| Piezo Failure Strength | 63 MPa |

Fabrication of the Microvalve

Fabrication of the microvalve consists of three main steps; fabrication of the piezoelectric trimorph actuator, and wafer fabrication and assembly of the microvalve. These steps consist of a combination of special MEMS and conventional fabrication methods.

Actuator Fabrication

The actuator is a trimorph piezoelectric bender with the dimensions of 20 mm×4 mm×0.290 mm. Two 127 m-thick PZT-5H type piezo layers are sandwiched around a 25 μmm thick brass layer to form the trimorph actuator, which is considerably thinner than commercially available trimorphs from Piezo Systems, Inc. or EDO corporation. Piezo ceramics and brass shim with the specified thickness are readily available in the market. An epoxy-phenolic adhesive, M-Bond 610, is used for bonding the layers together. The adhesive forms thin bond lines, is designed to transfer shear, and doesn't require a vacuum for curing to remove voids.

Fabrication of an actuator involves four main steps: cutting piezoelectric and brass beams, gluing the brass and piezoceramic beams into a trimorph sandwich structure, curing them and establishing electrical connections. To decrease the fabrication time, large actuator patches are built, from which individual actuators are cut. Besides decreasing the fabrication time, this method also decreases the risk of breaking the actuators and reduces the total cost of the microvalve. Experimentally, an optimal dimension for an actuator patch is found to be 25 mm×25 mm from which five actuators can be safely cut. Bigger plates are not desirable since they fail easily at high cutting speeds and are harder to fit in the dicing fixture.

For actuation, the piezo ceramic layers are oriented to have parallel polarization directions. It was found that the actuator had a loss of capacitance in piezo layers, accompanied by degraded performance. Thus a second fabrication method was used where no etching of the PZT electrodes is performed, which requires an additional electrical connection.

After dicing the piezo layers, the M-Bond 610 epoxy is applied to the inner surfaces of the piezo plates and both sides of the brass layer. All layers are left to air dry for about 15 minutes, which is necessary for a good bonding. Then the trimorph is assembled and cured for approximately four hours under a pressure from 10–70 psi at 100° C. Pressure can be applied by different means. One way to apply pressure is to use a vacuum pump with a vacuum pad. A large number of actuators were fabricated using this method. These actuators are not good enough in terms of desired thickness and thickness uniformity and exhibited a thermal strain. They averaged a thickness of 360 μmm, which is 70 μmm thicker than the original design. In addition, the thickness throughout an actuator is not uniform. It dramatically changes from the sides of the actuator to the middle, because of a possible glue accumulation at certain spots and air bubble formation within the glue layer, which are all results of insufficient cure pressure.

An improved way to apply pressure during the cure process is to use spring clamps. Silicone gum pads and aluminum back plates are used together with the clamp to hold the actuator. The area and clamping spring rates were chosen to give the optimal 30–35 psi pressure. The inner parts of the silicone pads are covered with Teflon films to prevent sticking of the actuator to the pads while the actuator is being cured. This method is observed to overcome the problems associated with the vacuum system. The actuators that are fabricated using the spring clamps are 290μm thick which is the design thickness value. They are also free of any non-uniformity in thickness. The spring clamp setup is cheap and easy to build. It also eliminates the need for electricity for the vacuum process and decreases the cost.

After the curing process, actuators with dimensions of 25 mm×'4 mm are cut from the patch using an Isomet 1000 precision saw machine. To cut the actuators, Plexiglas™ pads are used to sandwich the patch to prevent it from breaking. An average blade speed of 275 rev/min with a load of 100 gr is used to cut the actuators. Cutting a single actuator from the patch takes approximately 20 minutes.

Once the actuators are cut, they are ready for the final step of the fabrication, which is wiring. Four connections are required (one for each PZT electrode), which are achieved by soldering.

Once the actuator fabrication is complete, a silicon valve gate is added to the end. The valve gate has dimensions of 200×230×4000μm. It is first diced from a silicon wafer to the proper dimensions, and then it is bonded to the actuator using the same epoxy as used in the other fabrication steps. A Teflon jig is used support the gate during cure to ensure that it is mounted at a right angle to the actuator.

Wafer Fabrication

The valve body is constructed from single crystal silicon substrate. It consists of three layers; the bottom wafer that forms the actuator bed, the top wafer that creates the flow channel and the middle wafer, which serves as a shield against the flow pressure forces for the actuator. All three parts require high-aspect ratio micro machining and nearly vertical edges to prevent leakage.

Among the current MEMS etching techniques, DRIE is the most suitable one for the fabrication requirements of these wafers. DRIE etches using a plasma stream that can be tailored to different materials by selecting the appropriate ionized gas. It is a subtractive process, whereby a mask is created on the surface of the stock, which shields the parts that are not to be machined. The depth of the machining is controlled by the length of time that the masked device is exposed to the etchant. For devices that have grooves or holes machined down to different levels, e.g. the lower and middle wafers, multiple masks and subsequent DRIE cycles are required. After machining the etch resist is removed and the parts are cleaned.

Each of the three silicon valve parts is fabricated on separate silicon substrates. Six valve parts were laid out on each silicon wafer.

Final Assembly

The final assembly includes dicing the valve parts from the silicon substrates, aligning them under a microscope, and bonding them using similar procedures as for the actuator. Silicon wafers were temporarily bonded to a carrier wafer using photoresist and then cut using a wafer-dicing saw. The parts were then released using an acetone bath. Initially, a temporary method of bonding using 3M Super 77 adhesive has been developed and used to gather limited preliminary data. During the assembly, first the actuator is placed in the actuator bed, and then the middle and top layers were bonded on top of the first layer.

Testing

Actuator Testing

The actuators are tested to verify the tip deflections at room temperature and at elevated temperatures. A KD-300 photonic probe by MTS Instruments is used for deflection measurements, which are made on a Newport Newport RS-3000-38-12 optical bench. The probe is mounted in a steel fixture so that the axis of the probe is perpendicular to the surface being observed and the gap can be conveniently adjusted.

Before testing, the probe must be calibrated for the test surface. A brass shim is attached on the actuator to be used as surface target since brass has better reflectivity than piezo ceramic, which improves the test results. Calibration of the probe is done by step-by-step moving the probe away from the contact position to the optical peak position, where the voltage reading doesn't change with minor changes in the gap. This process consists of 40 steps if an average of 50 μm increments are used. A caliper permits precise movement of the probe. At each step, the probe is moved by the same amount and output voltage is recorded. After repeating this process for all points, the response characteristics of the sensor is obtained.

There are two useful ranges that are nearly linear. Since small motions are to be measured at the tip displacement of the trimorph actuator, the front slope of the calibration curve is used.

Once the calibration curve is obtained, the probe is set at a distance from the test surface near the midpoint of the linear region of the front slope of the calibration curve. Then, a controlled input voltage is applied to the actuator and the change in the probe output voltage is recorded. Using the change in the output voltage and the calibration curve, the corresponding deflection value is calculated for the applied input voltage. Deflection tests were repeated for different input voltages to verify the tip deflection and voltage-deflection relation.

Tests results of most recently fabricated three actuators are given in Table 2.

TABLE 2

Room temperature tests results

| Actuator Number | Room Temperature Deflection Input Voltage: 5 V |
|---|---|
| 1 | 32 μm |
| 2 | 29 μm |
| 3 | 30 μm |

From Table 2, it can be seen that the average deflection of the actuators is 30.3 μm when an input voltage of 5 V is applied. This is only 1.67 μm or 5.2% less than the theoretical deflection value obtained from the ANSYS model. This much loss in deflection is acceptable for this application.

Deflection test setup

After the room temperature tests, actuators are tested at elevated temperatures up to 100° C. The test probe and the fixture are placed in an oven and heated up to 100° C. Without applying any voltage the output voltage is recorded to determine any thermal deflections. There are two important issues for the high temperature tests, the thermal drift of the probe, and a permanent darkening of the brass, which changes the reflectivity of the material. To determine the thermal drift of the probe, the probe was installed on a solid brass surface and heated. This process was repeated several times and it was verified that the probe has a thermal drift of −0.24 V for a temperature difference of 80° C. on brass surface. To eliminate the brass darkening effects, the brass shim is heated and kept at 100° C. for approximately 20 minutes before the tests. Then the probe is calibrated on the darkened brass. For one actuator, at least four high temperature tests per side were conducted. Although the first actuators deflected thermally, after the refinements in fabrication process (clamping), actuators without any thermal deflection have been built. The second phase of the high temperature tests is to determine the actuation deflection at high temperatures when a voltage is applied. An input voltage of 5V is applied to the actuators while the ambient temperature is kept at 100° C. and it is observed that the actuators function safely and effectively at high temperatures. Deflection values obtained in these tests are exactly the same with the numbers obtained in room temperature tests.

Flow Testing

Future extensive flow testing will determine common valve characteristics such as accuracy and repeatability, response rate, load rate, turn down ratio, power consumption, max flow rate and the valve flow characteristic. Maps will be created for various pressure drops and for temperatures up to the operating temperature of a PEMFS (100° C.). Initial tests will be conducted using dry air, followed by tests using saturated hydrogen gas.

In this paper, fabrication and testing of a novel piezoelectric microvalve is presented. The microvalve is designed to improve hydrogen flow in fuel cells. A large number of actuators have been fabricated and tested using a photonic probe. Different fabrication techniques have been applied to decrease the fabrication time and cost, and to improve the fabrication quality and actuation. Extensive room temperature and high temperature deflection tests have been conducted. The microvalve actuator performed effectively in both temperature tests. The actuators averaged a deflection of 30.33 mm with 5 V input which is only 1.67 μmm less than the theoretical deflection value.

Silicon valve body parts are fabricated using DRIE etching technique. Parts were diced and have been aligned and temporarily assembled. Very limited flow testing has commenced, however no flow testing data has been provided. Extensive flow testing with humidified hydrogen at elevated temperature will follow to determine various performance characteristics of the valve.

Thus, in accordance with the invention, there has been provided a fuel cell control device that will operate under the chemical, temperature, and pressure environment of a fuel cell. There has also been provided a a fuel cell control device that will fit within the limited space confines of a fuel cell. Additionally, there has been provided a fuel cell control device that will not draw a significant amount of power from the fuel cell.

With this description of the invention in detail, those skilled in the art will appreciate that modification may be made to the invention without departing form the spirit thereof. Therefore, it is not intended that the scope of the invention be limited to the specific embodiments that have been illustrated and described. Rather, it is intended that the scope to the invention be determined by the scope of the appended claims.

We claim:

1. A fuel cell operable with a quantity of fuel and a quantity of an oxidizer to produce electrical power, the fuel cell comprising:
a fuel cell body including a labyrinth system structured to permit the fuel and the oxidizer to flow therethrough;
at least a first catalyst in fluid communication with the labyrinth; and
at least a first microvalve operably disposed within at least a portion of the labyrinth;
wherein the first microvalve includes a valve body, and deflectable member operable upon the application of a voltage from a voltage source;
a valve body having a first end and a second end, the valve body including an elongated flow channel formed therein and extending substantially longitudinally between the first and second ends to permit substantially longitudinal flow of the fluid therethrough and between the first and second ends; and
the deflectable member disposed on the valve body, the deflectable member including at least a first piezoelectric portion that is piezoelectrically operable to deflect the deflectable member between an open position and a closed position upon the application of a voltage, the deflectable member in the closed position being operable to resist the flow of the fluid through the flow channel.

2. The fuel cell of claim 1, wherein the deflectable member includes an intermediate layer is formed from brass.

3. The fuel cell of claim 1, wherein the valve body includes a cavity formed therein, at least a portion of the deflectable member being disposed in the cavity.

4. The fuel cell of claim 1, wherein the deflectable member includes a fixed end and a free end, the fixed end being secured to the valve body; and
the deflectable member including a gate disposed at the free end, at least a portion of the gate being receivable in the flow channel to resist the flow of the fluid through the flow channel when the deflectable member is in the closed position.

5. The fuel cell of claim 4, wherein the valve body includes a first wafer, a second wafer, and a third wafer; deflectable member includes a fixed end and a free end; the cavity being disposed substantially between the first and second wafers; and the flow channel being disposed substantially between the second and third wafers.

6. The fuel cell of claim 5, wherein the second wafer includes an opening formed therein; and at least a portion of the gate being receivable in the opening.

7. The fuel cell of claim 6, wherein the second wafer includes a port formed therein, the port providing fluid communication between the flow channel and the cavity.

8. The fuel cell of claim 1, wherein the first and second ends of the valve body are opposite on another.

9. The fuel cell of claim 1 wherein the fixed end and the free end of the deflectable member are opposite one another.

* * * * *